C. J. SLATER.
VEHICLE FRAME.
APPLICATION FILED JUNE 18, 1908.
922,351.
Patented May 18, 1909.
2 SHEETS—SHEET 1.
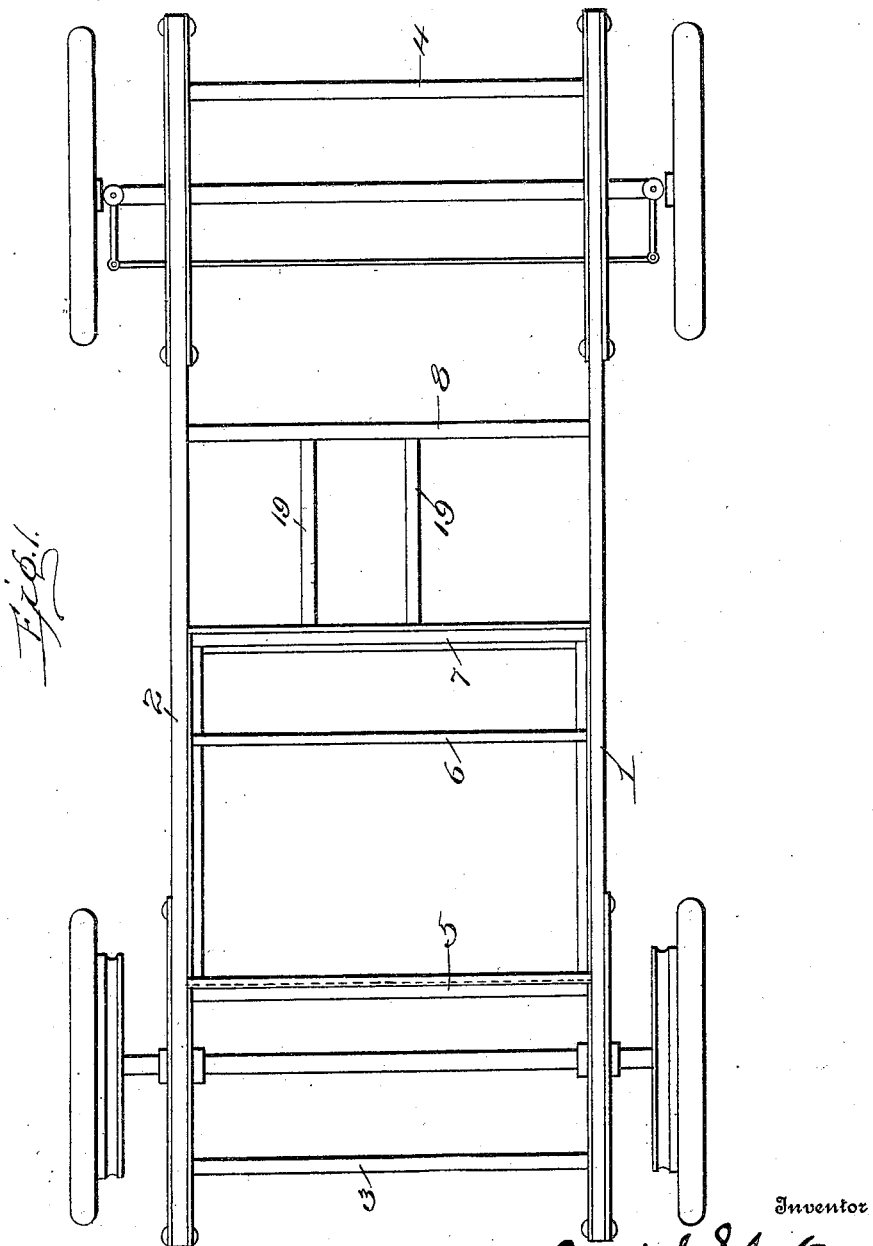

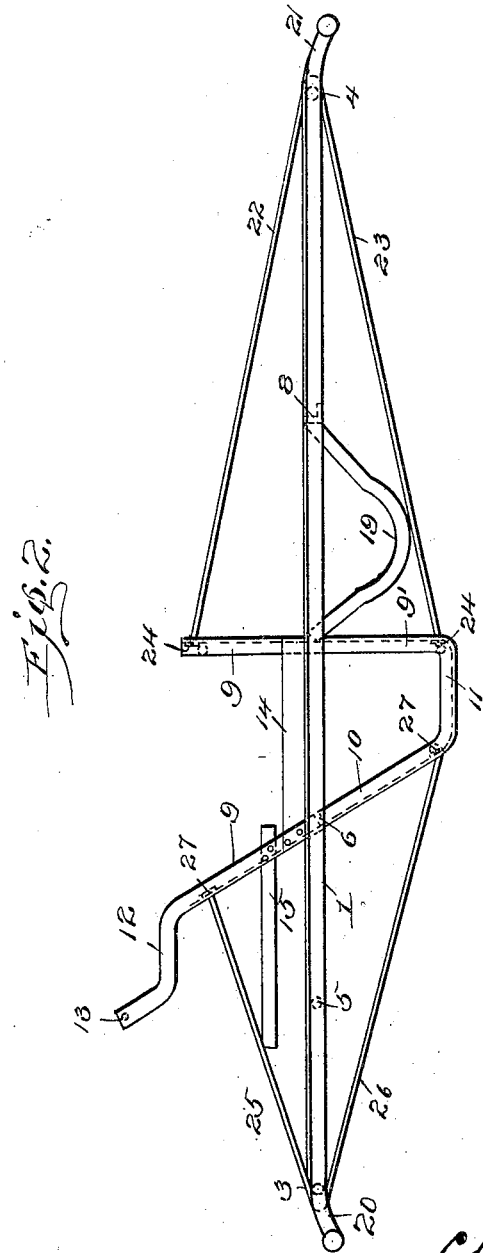

UNITED STATES PATENT OFFICE.

CHARLES J. SLATER, OF OAKLAND, CALIFORNIA, ASSIGNOR OF ONE-HALF TO P. L. WILLIAMSON, OF OAKLAND, CALIFORNIA.

VEHICLE-FRAME.

No. 922,351.      Specification of Letters Patent.      Patented May 18, 1909.

Application filed June 18, 1908. Serial No. 439,206.

*To all whom it may concern:*

Be it known that I, CHARLES J. SLATER, a citizen of the United States, residing at Oakland, in the county of Alameda and State of California, have invented certain new and useful Improvements in Vehicle-Frames, of which the following is a specification.

This invention relates to vehicle frame construction and the object of the invention is to produce a light and at the same time strong and durable frame especially designed for automobile service, providing for a material lowering of the center of gravity, resulting in easy riding qualities and also rendering it next to impossible to overturn the machine in ordinary usage.

A further object is to provide, in connection with the main frame, means intimately associated therewith for supporting the seat, the box, the engine or motor and the lazy back.

With the above and other objects in view, the nature of which will more fully appear as the description proceeds, the invention consists in the novel features of construction and arrangement of parts hereinafter fully described, illustrated and claimed.

In the accompanying drawings, Figure 1 is a plan view of the frame of this invention shown mounted upon carrying wheels. Fig. 2 is a side elevation of the same.

The frame contemplated in this invention comprises the main longitudinal side frame bars 1 and 2, the same being connected by the end cross streets 3 and 4, and other intermediate cross struts 5, 6, 7, 8, which are firmly and rigidly connected at their opposite ends to the main side bars 1 and 2.

9 designates a pair of oppositely-arranged seat and box frames each of which is substantially U shaped, comprising the front vertical portion to which the numeral 9′ is applied, the rear inclined portion 10, and the bottom connecting portion 11. The oppositely-arranged bottom portions 11 are adapted for the support of the flooring, the forward vertical portions 9′ provide for the support of the dash, and the rear inclined portions 10 provide for the support of the seat, the upper ends of the parts 10 being rearwardly offset as shown at 12 to extend to the back of the seat where they are connected to a cross strut (not shown) by means of openings 13.

The portions 9 and 10 of the frames hereinabove described are connected by longitudinal side braces 14, while extending back from the inclined portions 10 are seat frame supporting bars 15. The frame also comprises the oppositely-arranged motor hangers 19, the upper ends of which are connected to the main side frame bars 1 and 2 and braced by means of the cross struts 7 and 8, above referred to.

Secured to the opposite ends of the main side frame bars 1 and 2 are terminal irons 20 and 21 which connect with the ordinary front and rear springs of the vehicle. Extending from the front portion of each side bar backward, are upper and lower truss rods 22 and 23, respectively, which diverge rearwardly and connect to the upper and lower ends of the parts 9 of the seat and box supports, as shown in Fig. 2, the fastening of said truss rods being preferably accomplished by means of nuts as shown at 24. In like manner, upper and lower truss rods 25 and 26 extend divergently from the rear end of each main side frame bar forward, and are connected to the rear inclined members 10 of the seat and box supports above and beneath the plane of the side bars, as shown in Fig. 2, said truss rods being shown as connected to the parts 10 at their forward ends by means of nuts 27.

Having thus described the invention, what I claim is:—

1. Vehicle frame construction embodying main longitudinal side frame bars, a seat and box support extending above and below the plane of said side bars, and upper and lower truss rods extending divergently from the opposite ends of the side bars inward toward the center thereof and having their divergent ends fastened to the said seat and box support, substantially as described.

2. Vehicle frame construction embodying main longitudinal side frame bars, oppositely-arranged seat and box supports having a fixed relation to said side bars and extending above and beneath the plane thereof, and upper and lower truss rods extending from the opposite ends of the side bars toward each other and connected to the seat and box supports at points above and below the plane of the side bars.

3. Vehicle frame construction embodying main longitudinal side frame bars, seat and box supports fastened to said side bars and embodying upright and inclined portions extending above and beneath the plane of the side bars, and upper and lower truss rods extending from the opposite ends of the side bars toward the center of the frame and connected to the upright and inclined portions of the seat and box supports at points above and beneath the plane of the side bars.

In testimony whereof I affix my signature in presence of two witnesses.

CHARLES J. SLATER.

Witnesses:
CASSIUS M. JAY,
H. T. SMITH.